United States Patent [19]

Tanaka

[11] Patent Number: 5,115,350
[45] Date of Patent: May 19, 1992

[54] LIGHT INTERCEPTING APPARATUS OF LENS

[75] Inventor: Hitoshi Tanaka, Tokyo, Japan
[73] Assignee: Asahi Kogaku Kogyo Kabushiki Kaisha, Tokyo, Japan
[21] Appl. No.: 526,637
[22] Filed: May 22, 1990

[30] Foreign Application Priority Data

May 24, 1989 [JP] Japan ............... 1-60185[U]

[51] Int. Cl.⁵ .............................................. G02B 7/02
[52] U.S. Cl. ................................. 359/823; 359/611; 359/694; 354/403
[58] Field of Search ............. 350/255, 429, 430, , 350/580; 354/195.11, 195.12, 400, 403; 359/611

[56] References Cited

U.S. PATENT DOCUMENTS

| | | |
|---|---|---|
| 3,927,932 | 12/1975 | Chrosziel . |
| 4,275,952 | 6/1981 | Uesugi ................ 359/694 |
| 4,441,794 | 4/1984 | Field ................... 359/611 |
| 4,759,618 | 7/1988 | Kamata ............... 359/694 |
| 4,944,030 | 7/1990 | Haraguchi et al. ... 354/403 |

FOREIGN PATENT DOCUMENTS 63-30837  2/1988  Japan .
1258365  12/1971  United Kingdom .

*Primary Examiner*—Loha Ben
*Attorney, Agent, or Firm*—Sandler, Greenblum & Bernstein

[57] ABSTRACT

A light intercepting apparatus provided between a lens barrel which moves in an optical axis direction and a lens holding member which supports the lens barrel so as to slide in the optical axis direction, includes a pair of light intercepting rings which are provided on the lens holding member. Each of the light intercepting rings is made of a flexible material and has a center opening having a diameter that is smaller than an outer diameter of the lens barrel. The inner ends of the light intercepting rings which define the center openings are deformed in opposite directions and brought into contact with an outer peripheral surface of the lens barrel.

18 Claims, 3 Drawing Sheets

LIGHT INTERCEPTING APPARATUS OF LENS

BACKGROUND OF THE INVENTION

1. Field of the Invention

The present invention relates to a light intercepting apparatus which prevents harmful light from entering a lens barrel through an annular gap between a lens barrel, which moves in an optical axis direction, and a lens holding cylinder, which supports the lens barrel so as to move in the optical axis direction.

2. Description of the Related Art

In a conventional lens shutter type of compact camera having a range finder, a focal length of a photographing lens is usually not variable. However, recently, range finder type compact cameras having an autofocus function and a photographic zoom lens have been developed. In this compact camera zoom, a lens barrel advanced from the camera body during a zooming operation moves in the optical axis direction.

To smoothly advance the lens barrel from the camera body, a slight gap must be provided between the outer periphery of the lens barrel and a lens holding member which is provided on the camera body to movably support the lens barrel. Accordingly, there is a possibility that light enters the camera body through the gap between the outer periphery of the lens barrel and the lens holding member, resulting in the undesired exposure of a film in a film chamber. To prevent such an undesirable exposure by harmful light, a light intercepting apparatus, as shown in FIGS. 5 and 6 is usually provided.

In FIG. 5, a lens holding member (cylinder) 2 has a center bore 2A in which lens barrel 1 is movably inserted and which has an inner diameter having a predetermined tolerance with respect to the outer diameter of the lens barrel 1. A flock paper 4, having a predetermined width, is adhered to the inner periphery 2B at a front end of the center bore 2A of the lens holding cylinder 2, so that the inner surface of the flock paper 4 comes into sliding contact with the outer periphery of the lens barrel 1 to intercept harmful light which would otherwise enter the camera between the gap between the inner peripheral surface of the lens holding cylinder 2 and the outer peripheral surface of the lens barrel 1.

In an arrangement illustrated in FIG. 6, the annular light intercepting tongue 5, which is made of an elastic material, such as rubber or resin film or the like, is provided on front end 2C of the lens holding member 2, in addition to the flock paper 4 shown in FIG. 5. The light intercepting tongue 5 has an inner diameter which is slightly smaller than the outer diameter of the lens barrel 1. The annular light intercepting tongue 5 is deformed to increase the inner diameter thereof when the lens barrel 1 is fitted in the annular light intercepting tongue 5, so that the inner peripheral surface of the annular light intercepting tongue 5 comes into close contact at the front end thereof with the outer peripheral surface of the lens barrel 1 to intercept harmful light. The direction of front end of the annular light intercepting tongue 5 is reversible in accordance with the axial movement of the lens barrel 1 in the opposite directions. Numerals 3 and 21 in FIGS. 5 and 6 designate an outer shell and a cam ring, respectively, which actuates the lens barrel 1 to advance while rotating.

In the above mentioned conventional structures, however, the flock paper 4 hardly deforms in the direction of thickness thereof, and accordingly, a possible dimensional error or a displacement in the direction of thickness can not be effectively absorbed. Namely, possible "out of roundness" and "out of concentricity" of the lens barrel 1 and the center bore 2A of the lens holding member 2 can not be effectively absorbed by the flock paper 4. As a result, a slight gap, which causes the harmful light to enter from outside of the lens barrel 1, may exist between the lens barrel 1 and the lens holding member 2.

Furthermore, in an arrangement shown in FIG. 6 in which the light intercepting tongue 5 is additionally provided, a set screw 7 is usually used to secure some member to the lens barrel 1. The lens barrel 1 has a recess 1A in which head 7A of the set screw 7 is received. In this case, there is a possibility that harmful light enters through the recess 1A, as shown by an arrow 1 in FIG. 6.

SUMMARY OF THE INVENTION

The primary object of the present invention is to provide a light intercepting apparatus which can effectively intercept harmful light, regardless of possible "out of roundness" and "out of concentricity" of the lens barrel and the center bore of the lens holding member and even if there is a bored recess on the outer surface of the lens barrel to receive the head of a set screw.

To achieve the object mentioned above, according to the present invention, there is provided a light intercepting apparatus between a lens barrel and a lens holding member which supports the lens barrel so as to slide in the optical axis direction, comprising a pair of light intercepting rings provided on the lens holding member, each of the light intercepting rings being made of a flexible material and having a center opening of a diameter that is smaller than the outer diameter of the lens barrel, the inner ends of the light intercepting rings which define the center openings being deformed in opposite directions to be brought into contact with the outer peripheral surface of the lens barrel.

Preferably, the inner ends of the light intercepting rings which define the center openings are deformed enough to prevent the directions of the deformation from being reversed in accordance with an axial slide movement of the lens barrel.

According to an embodiment of the invention, each of the light intercepting rings comprises a flexible body ring and a reinforcing ring adhered to the flexible body ring.

According to an aspect of the present invention, there is provided a light intercepting apparatus between a lens barrel which is provided on its outer peripheral surface with a recess and a lens holding member which supports the lens barrel so as to slide in the optical axis direction, comprising a light intercepting means on the lens holding member, which comes into sliding contact with the outer peripheral surface of the lens barrel to seal the latter. The light intercepting means has an axial surface seal length which is larger than the axial width of the recess formed on the outer surface of the lens barrel.

BRIEF DESCRIPTION OF THE DRAWINGS

The invention will be described below in detail with reference to the accompanying drawings, in which.

DESCRIPTION OF PREFERRED EMBODIMENTS

Figure 1:
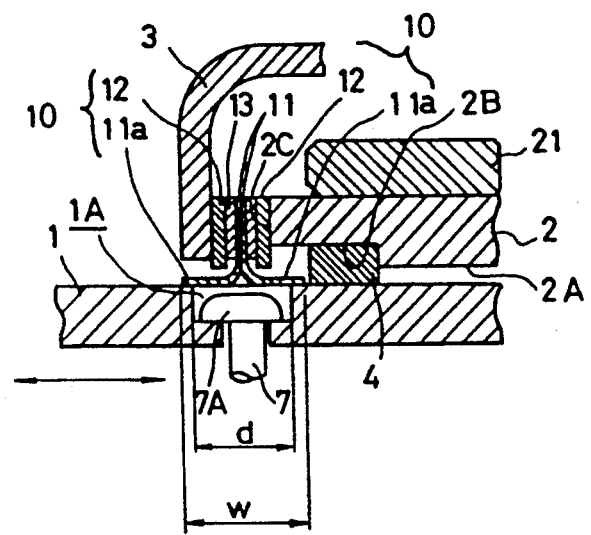
FIG. 1 is a partial sectional view of a light intercepting apparatus which is applied to a camera, according to an aspect of the present invention.

In a camera illustrated in FIG. 1, a lens holding member (cylinder) 2 has a center bore 2A in which a lens barrel 1 is inserted so as to move in the optical axis direction. Numerals 3 and 21 designate an outer shell and a cam ring, respectively, which actuates the lens barrel 1 to advance while rotating.

The center bore 2A of the lens holding cylinder 2 has at its front end a larger diameter portion 2B having a predetermined axial length. An annular flock paper 4 is applied to the inner periphery of the larger diameter portion 2B, so that a flock paper 4 comes into contact with the outer periphery of the lens barrel 1 to intercept stray light.

To a front end 2C of the lens holding member 2 are adhered a pair of light intercepting rings 10, 10 which are superimposed one on another.

Figure 2A:
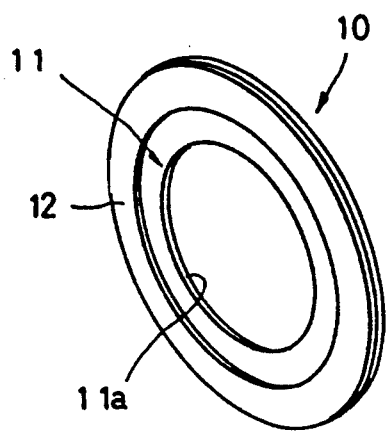
FIG. 2A is a perspective view of a light intercepting member shown in FIG. 1.
Figure 2B:
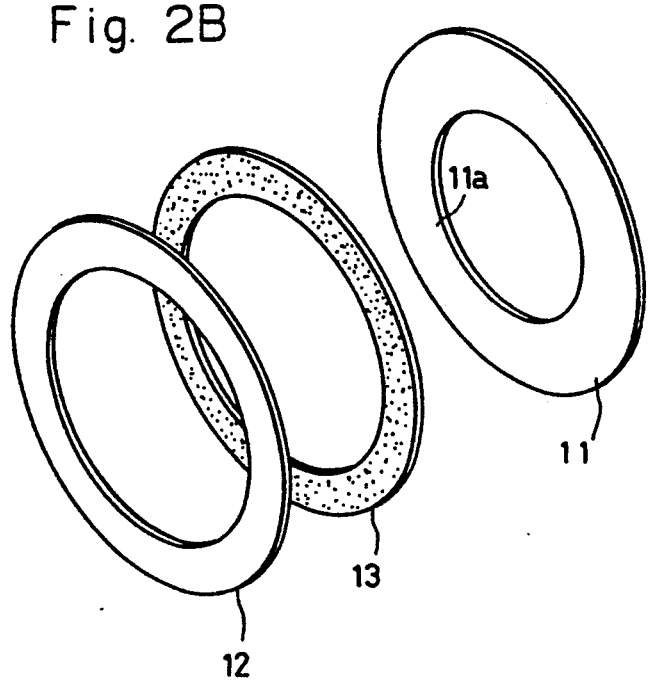
FIG. 2B is an exploded perspective view of the light intercepting member shown in FIG. 2A.

Each of the light intercepting rings 10 has a flexible body ring 11 and a reinforcing metal plate ring (hard ring) 12 which is superimposed on and adhered to one side of the flexible body ring 11 by an adhesive 13. The flexible body ring 11 is made of a synthetic resin plate (resin film or sheet) having a light intercepting property and which has a predetermined inner and outer diameter. The reinforcing metal plate ring 12 has an outer diameter that is almost the same as that of the body ring 11 and an inner diameter that larger than that of the body ring 11 by a predetermined value, as can be seen in FIGS. 2A and 2B.

The inner diameter of the center opening 11a of the body ring 11 is smaller than the outer diameter of the lens barrel 1 by a predetermined value, so that when the lens barrel 1 is fitted in the light intercepting rings 10, the inner edges of the body rings 11 are elastically deformed into a conical shape. The amount of deformation, i.e. the axial length of the deformed inner edges of the body rings 11 extending along and on the outer periphery of the lens barrel 1 is such that no reversal in the direction of extension of the deformed inner edges occurs due to the reciprocal axial movement of the lens barrel 1.

Alternatively, it is also possible to provide body rings 11, each having a conical inner opening 11a in their free state as viewed in a longitudinal section. In this alternative, the inner edges of the body rings 11 deform and come into elastic contact with the outer periphery of the lens barrel 1.

A pair of light intercepting rings 10, which are superimposed one on another and interconnected, are secured to and between the front end 2c of the lens holding member 2 and the outer shell 3, so that the body rings 11 are coaxial to the center bore 2A of the lens holding member 2 in a symmetrical arrangement in which the body rings 11 are symmetrically opposed to each other.

The lens barrel 1 is inserted and fitted in the light intercepting rings 10 by elastically deforming the body rings 11 into a conical shape, as mentioned above. The directions of the deformation, i.e. the directions of elongation of the inner ends of the body rings 11 of the two light intercepting rings 10 are opposite to each other, as can be seen in FIGS. 3A through 3C, so that no interference of the deformed inner ends occurs.

In the case where there is a bored recess 1A in which a head 7A of a set screw 7 can be received on the outer periphery of the lens barrel 1, the total length (effective seal length) "W" of the deformed inner ends of the body rings 11 must be longer than the axial length "d" of the bored recess 1A, as shown in FIG. 1.

Figures 3A, 3B, 3C:
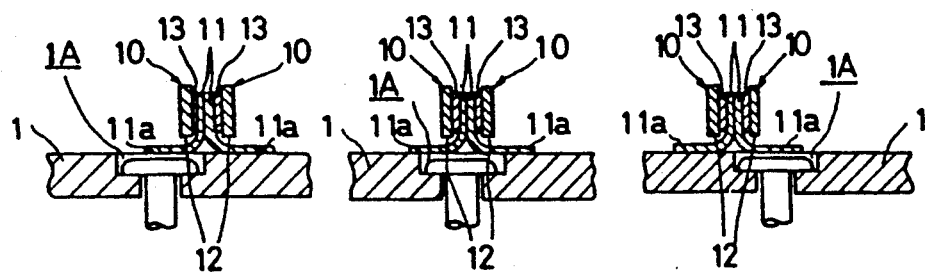
FIGS. 3A through 3C are partial sectional views of a light intercepting member, shown in different operational positions, in accordance with an axial movement of the lens barrel.

Because of the above-mentioned relationship where d < W, at least one of the inner ends of the body rings 11 of the two light intercepting rings 10 is always in contact with the outer peripheral surface of the lens barrel 1, regardless of the axial displacement of the lens barrel 1, so that one of the contact portions can prevent harmful light from entering the camera to expose a film (not shown), as shown in FIGS. 3A through 3C.

Note that the inner end of the body ring 11 of the front light intercepting ring 10 (left light intercepting ring in FIG. 1) does not protrude outside from the front end of the outer shell 3. This avoids an unsightly appearance of having the inner end of the body ring 11 being exposed to and eliminates the possibility that the inner end of the body ring 11 will be damaged.

Even when the lens barrel 1 reciprocally moves (slides) in the optical axis directions, no direction change in the deformed state of the inner ends of the body rings 11 of the light intercepting rings 10 takes place. Namely, the inner edges of the body rings 11 are always kept in contact with the outer peripheral surface of the lens barrel 1 to effectively intercept harmful light.

Figure 4:
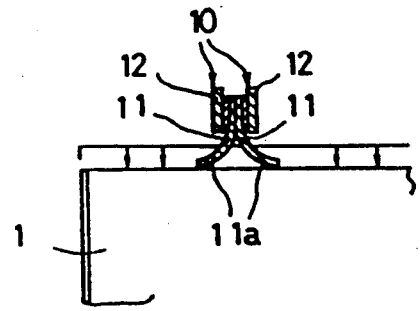
FIG. 4 is the partial sectional view of a light intercepting member, shown in an eccentric position on the lens barrel.
Figure 5:
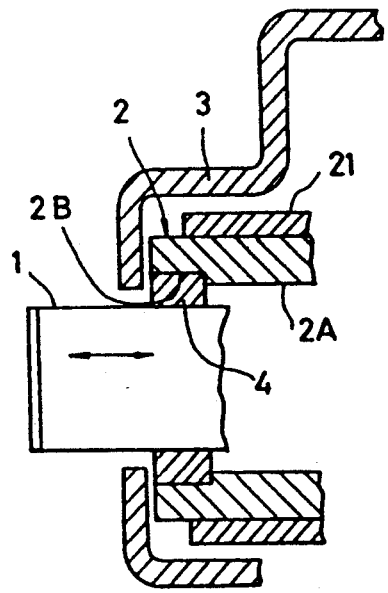
FIGS. 5 and 6 are sectional view of two known light intercepting apparatuses.
Figure 6:
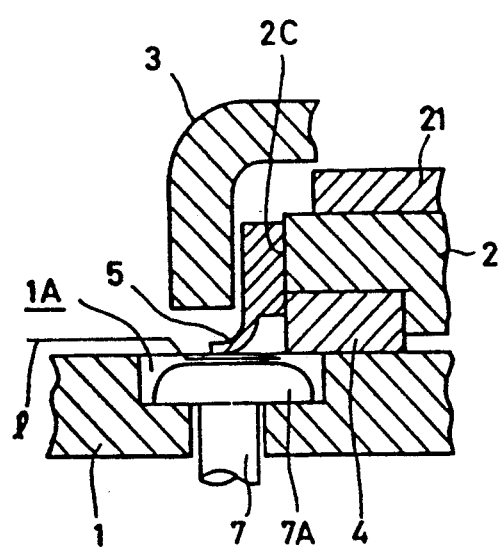

In the case where there is "out of roundness" and/or "out of concentricity (i.e. eccentricity)" of the lens barrel 1 and the lens holding member 2, which may be caused even after assembly when an external force is applied thereto, the deformed inner ends of the body rings 11 deform or are restored to absorb the "out of roundness" and/or "eccentricity", as shown in FIG. 4, thereby maintaining the close contact of at least one of the inner ends of the body rings 11 with the outer peripheral surface of the lens barrel 1.

Finally, it should be appreciated that since the light intercepting apparatus according to the present invention can be realized by thin light intercepting rings (plates), no additional space for providing the light intercepting apparatus is substantially needed, thus resulting in the realization of a compact and light camera.

I claim:

1. A light intercepting apparatus positioned between a lens barrel which moves in an optical axis direction and a lens holding member which supports said lens barrel so as to slide in the optical axis direction, comprising:

a pair of light intercepting rings provided on said lens holding member, each of said light intercepting rings being made of a flexible material and having a center opening of a diameter smaller than an outer diameter of said lens barrel;

wherein inner ends of said light intercepting rings which define said center openings are deformed in opposite directions so as to be brought into contact with an outer peripheral surface of said lens barrel.

2. A light intercepting apparatus according to claim 1, wherein said inner ends of said light intercepting rings which define said center openings are deformed enough to prevent the deformation from being reversed in accordance with an axial sliding movement of said lens barrel.

3. A light intercepting apparatus according to claim 1, wherein said light intercepting rings are symmetrically opposed to each other and superimposed one on another, so that said inner ends thereof do not interfere with each other.

4. A light intercepting apparatus according to claim 1, wherein each of said light intercepting rings comprises a flexible body ring and a reinforcing ring that is adhered to said flexible body ring.

5. A light intercepting apparatus according to claim 4, wherein said reinforcing ring has an inner diameter that is larger than said center opening of said flexible body ring.

6. A light intercepting apparatus according to claim 1, further comprising an annular flock paper which is provided between said outer periphery of said lens barrel and an inner periphery of said lens holding member, said annular flock paper being located inside said light intercepting rings.

7. A light intercepting apparatus according to claim 1, wherein said lens barrel is provided on its outer peripheral surface with a recess.

8. A light intercepting apparatus according to claim 7, wherein a total length of deformation of said inner ends of said light intercepting rings is larger than an axial width of said recess of said lens barrel.

9. A light intercepting apparatus according to claim 1, further comprising an outer shell provided outside said lens holding member.

10. A light intercepting apparatus according to claim 9, wherein said light intercepting rings are held between and connected to a front end face of said lens holding member and said outer shell.

11. A light intercepting apparatus according to claim 1, wherein said light intercepting rings are made of synthetic resin.

12. A light intercepting apparatus, comprising:
a lens barrel defining an outer peripheral surface, said surface having a recess;
a lens holding member which supports said lens barrel so as to slide in an optical axis direction; and
means for intercepting light, said light intercepting means being positioned between said lens barrel and said lens holding member and intercepting light on said lens holding member, said light intercepting means coming into sliding contact with said outer peripheral surface of said lens barrel to seal said lens barrel, said light intercepting means having an inner axial surface which is larger than an axial width of said recess in said lens barrel.

13. A light intercepting apparatus according to claim 12, wherein said light intercepting means comprises a plurality of light intercepting rings.

14. The light intercepting apparatus of claim 12, wherein said lens holding member is fixedly mounted.

15. The light intercepting apparatus according to claim 14, wherein said light intercepting means is secured to said lens holding member.

16. The light intercepting apparatus according to claim 12, wherein said light intercepting means defines an inner surface, said inner surface of said light intercepting means being smaller than said outer peripheral surface of said lens barrel.

17. The light intercepting apparatus according to claim 12, wherein said light intercepting means deformingly engages said lens barrel.

18. The light intercepting apparatus of claim 12, wherein said light intercepting means is in elastic sliding contact with said outer peripheral surface of said lens barrel.

* * * * *